United States Patent [19]

Chlumecky et al.

[11] Patent Number: 4,660,895

[45] Date of Patent: Apr. 28, 1987

[54] RAILWAY LOCOMOTIVE BRAKE CONTROL SYSTEM

[75] Inventors: Wayne E. Chlumecky, Downers Grove; John H. Cryder, Plainfield; Robert A. Colombo, Joliet; Robert E. Spenk, Chicago, all of Ill.

[73] Assignee: General Motors Corporation, Detroit, Mich.

[21] Appl. No.: 851,883

[22] Filed: Apr. 11, 1986

Related U.S. Application Data

[63] Continuation-in-part of Ser. No. 609,785, May 14, 1984, abandoned.

[51] Int. Cl.[4] .......... B60T 15/28

[52] U.S. Cl. .......... 303/75; 303/66

[58] Field of Search .......... 303/3, 14, 19, 26, 28, 303/33, 35, 36, 66, 75

[56] References Cited

U.S. PATENT DOCUMENTS

| | | | |
|---|---|---|---|
| 1,805,631 | 5/1931 | McCune | 303/75 X |
| 2,048,327 | 7/1936 | Farmer | 303/35 |
| 2,785,933 | 3/1957 | McClure et al. | 303/60 |
| 2,789,016 | 4/1957 | Gorman | 303/3 |
| 2,802,701 | 8/1957 | McClure | 303/39 |
| 3,018,138 | 1/1962 | Wilson et al. | 303/36 |
| 3,022,117 | 2/1962 | Hewitt | 303/39 |
| 3,232,678 | 2/1966 | Wilson | 303/80 |
| 3,951,468 | 4/1976 | Kolbeck et al. | 303/81 |
| 3,966,272 | 6/1976 | Wickham | 303/81 |
| 4,033,632 | 7/1977 | Wilson | 303/74 |
| 4,045,095 | 8/1977 | Temple | 303/37 |
| 4,095,850 | 6/1978 | Wickham | 303/36 |
| 4,125,292 | 11/1978 | Worbois et al. | 303/36 |
| 4,417,767 | 11/1983 | Billeter | 303/23 R |

OTHER PUBLICATIONS

Instruction Pamphlet No. 74, Jun. 1964, New York Air Brake Co., Plate 1.

Pamphlet "AB Single Capacity Freight Car Air Brake Equipment with the ABDW Control Valve", Westinghouse Air Brake Division, undated, Preface and Plate 1.

Plate 5 Piping Diagram of Freight Car Brake Equipment with ABD Control Valve, etc.—undated and source unidentified.

*Primary Examiner*—Duane A. Reger
*Attorney, Agent, or Firm*—Robert J. Outland

[57] ABSTRACT

A railway locomotive brake control system that substitutes a part of a standard freight car brake control valve and interconnected pilot valves and other readily available components to provide the operating functions of the usual specially designed freight locomotive brake valve at a reduced cost. Systems without and with types I or II dynamic brake interlocks are illustrated.

7 Claims, 7 Drawing Figures

RAILWAY LOCOMOTIVE BRAKE CONTROL SYSTEM

CROSS REFERENCE

This is a continuation-in-part of U.S. patent application Ser. No. 609,785 filed on May 14, 1984, now abandoned.

TECHNICAL FIELD

This invention relates to railway locomotive brake systems and more particularly to control systems for freight and switcher locomotive brakes which utilize control valves mass produced for freight car application.

BACKGROUND

In commonly used brake systems for railway freight trains, each locomotive unit has a control valve that functions to control brake cylinder pressure in response to reductions of brake pipe pressure. This is known as the automatic brake. Each railway freight car also has a control valve that performs a similar function.

There are however differences in the braking requirements of railway freight cars and locomotives which require differences in their brake systems. For effective performance, locomotives are designed with about three times the braking capability of a freight car. This difference produces operating conditions which make it necessary when pulling a train to release an automatic brake application on the locomotive without releasing the car brakes. For example:

(1) When proceeding down a grade during which train speed must be controlled over an extended period of time by brake application, the locomotive wheels would be overheated if its brakes were not released.

(2) In any automatic brake application on a train, the locomotive brake if allowed to apply may cause the cars to "run in" on the locomotive, thereby causing undesirable slack action.

Commonly used locomotive control valves, such as the 26F, 26D and 6NR locomotive control valves, are operative in response to a pressure signal to release the locomotive automatic brake. This is known as "actuating brakes off". The approved ABDW and limited approval ZIAW freight car brake control valves have no need for this feature. On the other hand, the freight car valves include emergency portions which perform functions critical to the rate of transmission and development of brake cylinder pressure in a train in emergency. Emergency functions of this nature are not required of locomotive control valves. Thus, while the freight car and locomotive control valves perform the same basic functions, they are not interchangable because both also perform specialized functions designed to suit their individual service requirements.

Since there are many more railway cars produced and in service than there are locomotives, the freight car brake control valves are produced in much greater volume and at much lower cost than the brake control valves applied to locomotives. Accordingly the cost of a locomotive brake system is proportionally higher than that of a railway freight car.

SUMMARY OF THE INVENTION

The present invention provides more economical, lower cost locomotive brake control systems than those heretofore applied, in which the high cost specialized brake control valve specifically designed for locomotive use is replaced by a system that includes commonly available lower cost valves, including a portion of a relatively high production low cost railway freight car brake control valve.

A brake system according to the invention includes the service portion of a railway freight car control valve, together with pilot valves and other mass produced or low cost elements, arranged to preferably provide all of the functional operating requirements of the usual railway freight locomotive brake system but at a lower cost for the initially installed or subsequently replaced components.

In a typical application, the service portion of an ABDW or ZIAW railway car valve is mounted on an AB pipe bracket with the emergency side blanked off. The brake cylinder pressure passages must be crossported in the blanking plate. Economic factors may suggest replacing the AB pipe bracket with a simplified version. The quick release part of the service portion of each valve provides a manual release capability which is not required on a locomotive and so may also be blanked off with cross-porting of brake cylinder passages.

The remaining part of the service portion of the railway car valve, applied with appropriate reservoirs, will control locomotive air brakes in response to changes in brake pipe pressure. An additional three-way valve is applied to cause the appropriate system response for emergency brake application. Other elements of the system are added to provide the capability of actuating brakes off, that is, releasing the locomotive brakes without affecting the brake pipe pressure. The actuating functions must be performed under manual control in response to a pressure signal and also, in locomotives having dynamic brakes, in response to an electrical signal indicating application of the dynamic brake.

Two different performance criteria exist for brake control systems interlocked with dynamic brakes. In type I systems, if an automatic brake application is in effect when the dynamic brake is released, the locomotive automatic brakes must apply. In type II systems, the locomotive automatic brake must not apply upon release of the dynamic brake merely because an automatic brake application is then in effect on the train or because an additional brake pipe reduction was made while dynamic brakes were applied.

The arrangements of the present invention to be hereinafter more specifically described are capable of providing the requirements of these various performance criteria.

BRIEF DRAWING DESCRIPTION

DETAILED DESCRIPTION

Figure 1:
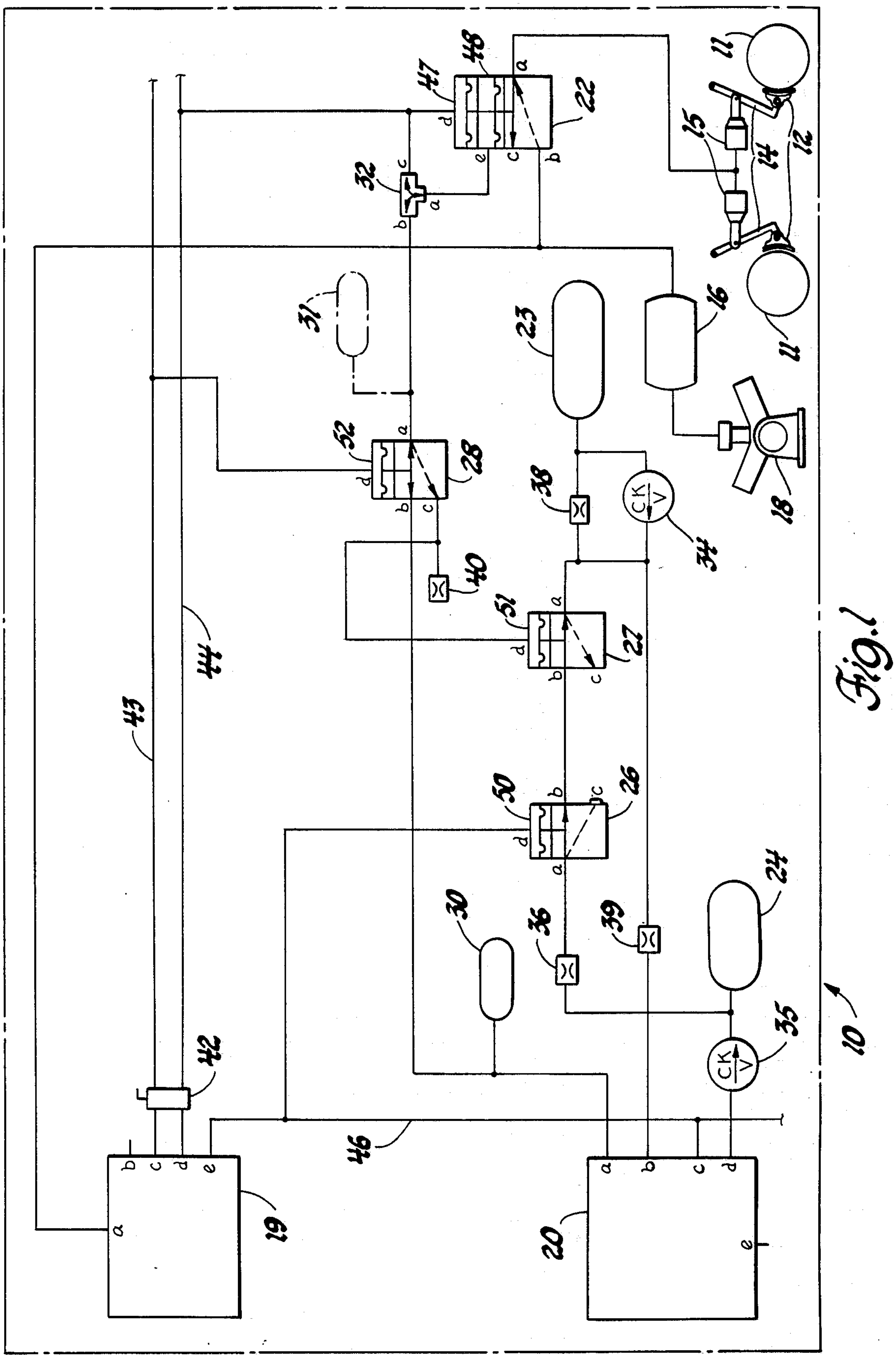
FIG. 1 is a schematic view of a locomotive with an air brake system meeting the requirements of freight locomotives not equipped with dynamic brake.

Referring now specifically to FIG. 1 of the drawings, numeral 10 generally indicates a railway freight locomotive having a basic air brake system formed in accordance with the invention. Locomotive 10 includes the usual running gear including a plurality of rail engaging wheels 11 which function to support, drive and brake the locomotive.

The locomotive is provided with a brake system which conventionally includes wheel engageable shoes 12 supported by suitable brake linkage or rigging 14 and applied by brake cylinders 15. Pressurized air for actuating the brake cylinders is supplied from a main reservoir 16 which is maintained at a predetermined pressure level by an engine or motor driven air compressor 18. To control the admission and exhaust of air to and from the brake cylinders in accordance with the requirements of locomotive service, the brake cylinders 15 and the main reservoir 16 are connected with various components and conduits, or pipes, comprising an air brake control system.

Main components of the brake control system include an operator actuated brake valve 19, a pressure actuated brake control valve 20, a brake actuating pilot operated relay valve 22, an auxiliary reservoir 23, an emergency reservoir 24 and first, second and third control pilot valves 26, 27, 28 respectively. Additional components include a balancing reservoir 30, an optional reservoir 31, a double check valve 32, single check valves 34, 35 and four chokes 36, 38, 39 and 40. A dual ported cutout cock 42 and a network of pipes interconnecting the various elements are also provided.

Certain of the components, including the brake valve 19, control valve 20, relay valve 22, pilot valves 26–28 and double check valve 32 include a plurality of ports which are identified with the letters a, b, c etc. up to e as necessary. In a preferred embodiment, the volumes of the reservoirs are as follows: auxiliary reservoir 23 is 1000 $in^3$, emergency reservoir 24 is 1250 $in^3$, balancing reservoir 30 is 235 $in^3$. The optional reservoir 31 is 35 $in^3$ and is used when a J1 relay valve 22 replaces the preferred J1.6-16 valve. The various chokes have orifices equivalent to the following standard drill sizes: choke 36—#60 drill, choke 38—#61 drill, choke 39—#47 drill, choke 40—3/32 inch drill.

In the system, the air compressor 18 supplies air to the main reservoir 16 which is in turn connected to port a of the brake valve 19 to provide it with an air supply. The brake valve is connected in the system and functions in the same manner as in commonly used locomotive brake systems. It therefore includes an independent brake portion which connects through port c with an actuating pipe 43 and through port d with an independent brake pipe 44. A separate automatic brake portion of the brake valve connects through port e with a brake pipe 46 that is trainlined, that is connected with the brake pipes of all the other locomotive units in the consist as well as with the brake pipes of the railroad cars in a connected train.

The brake relay valve 22 preferably consists of a known J1.6-16 relay valve, although a J1 relay or any other suitable three-way relay valve could be used with appropriate system adjustments. As installed, the relay valve 22 normally connects the brake cylinders 15 with atmosphere through connected ports a and c. Port b is connected to the main reservoir but is normally cut off from port a. Pressure supplied to either or both of dual pilots 47, 48 through ports d and e respectively will actuate the relay valve 22 to connect ports a and b, thereby supplying pressure from the main reservoir to the brake cylinders in an amount controlled by the pilot pressure to apply the brakes in known fashion.

For this purpose, pilot 47 and pilot 48 (the latter through double check valve 32) are connected with the independent brake pipe 44. This permits direct application of the locomotive brakes by pressurizing the independent brake pipe from the independent brake portion of the brake valve 19. Cutout cock 42, in both the independent brake and actuating pipes, is set in the open position in the lead unit of a locomotive consist to permit control of the brakes in all units, but is closed in the trailing units to disconnect their control functions.

The brake control valve 20 utilizes the internal structure of the prior ABDW control valve service portion connected in the following manner. Port a is connected with the balancing reservoir 30 and is normally connected with pilot 48 of the relay valve through ports b and a of the third pilot valve 28, ports b and a of the double check valve 32 and the relay port e. The double check valve 32 prevents any flow between its ports b and c and thus prevents connection of the control valve 20 with the first pilot 47 of the relay. By this arrangement, preferred levels of braking force are available for both automatic and an independent brake operation. The optional reservoir 31 is connected with the line feeding the pilot 48 of relay valve 22 if a J1 relay is substituted for the preferred model.

Port b of the control valve 20 connects through the chokes 39 and 38 with the auxiliary reservoir 23. Return flow from the reservoir 23 to port b of valve 20 is permitted through check valve 34, which is connected in parallel with choke 38. Port b also connects through choke 39 and ports a and b of the second and first pilot valves 27, 26, respectively, as well as an additional choke 36 with the emergency reservoir 24.

The pilot valves 26, 27, 28 are provided with separate pilots 50, 51, 52 respectively opening through their ports d. When unpressurized, the pilot valves 26, 27, 28 are positioned with their ports a and b connected. When adequate pilot pressure is applied, the valves move to positions connecting their ports a and c. In valve 26, port c is plugged while, in valve 27, port c is open to exhaust. Port c of valve 28 is connected with the pilot 51 of pilot valve 27 as well as with the choke 40. Pilot 52 of pilot valve 28 is connected to the actuating pipe 43, while pilot 50 of pilot valve 26 is connected with the brake pipe 46.

Port c of the brake control valve 20 is also connected with the brake pipe 46 while port d of valve 20 connects with the emergency reservoir 24 through a check valve 35 that permits flow only in the direction from the valve 20 to the reservoir 24. Port e of valve 20 provides an exhaust to atmosphere which is internally connected to port a when the control valve 20 is in the release mode.

OPERATION

In operation of a basic locomotive brake system in accordance with the embodiment just described, the brake valve 19 functions in conventional manner at the direction of the locomotive engineer (operator) to control pressures in the trainlined brake pipe 46 as well as in the actuating pipe 43 and the independent brake pipe 44. When both independent and automatic brake valve portion handles, not shown, are in their release positions, the actuating and independent brake pipe pressures are zero while a predetermined running pressure is maintained in the brake pipe 46.

Brake pipe pressure acting on the pilot 50 normally positions the pilot valve 26 to connect ports a and c, cutting off the connection of the emergency reservoir 24 with port b of the control valve 20. The emergency reservoir is, however, charged to brake pipe pressure from the brake pipe passing into port c of the control valve 20 and out through port d and the check valve 35. In like manner, brake pipe pressure passing through ports c and b of the control valve 20, charges the auxiliary reservoir 23 at a rate primarily controlled by the choke 38. The choke 38, check valve 34 and one of the parallel connections may be omitted if restriction of the auxiliary reservoir charging rate is not desired.

As long as the pressure in the auxiliary reservoir 23 remains equal to or less than that in the brake pipe 46, the control valve 20 is maintained in the release position in which no pressure is supplied from port a to the pilot 48 of relay valve 22. Thus valve 22 remains in its release position connecting the brake cylinders to atmosphere through port c and maintaining the brakes released.

When the system is charged, an automatic brake application may be made by reducing pressure in the brake pipe through the locomotive engineer's operation of the automatic portion of brake valve 19. The reduced brake pipe pressure creates a differential pressure within the control valve 20 that allows auxiliary reservoir pressure to move the valve 20 to an application position, connecting ports b and a. Thus air flows from the auxiliary reservoir 23 through the check valve 34, if used, choke 39, valve 20, pilot valve 28 and double check valve 32 to the pilot 48 of the relay valve 22. This moves the relay valve to connect ports a and b, allowing a flow of pressurized air from the main reservoir 16 to the brake cylinders 15 in an amount proportional to the reduction of brake pipe pressure, thus applying the locomotive brakes.

To prevent or release an automatic brake application on the locomotive without releasing the train brakes, the actuating pipe 43 is charged by the engineer's depressing the independent brake valve handle, not shown, in the independent portion of the brake valve 19. Pressure is thus directed to the pilot 52 of valve 28, which connects ports a and c, interrupting the connection of the control valve 20 with the relay valve 22. With the actuating pipe thus pressurized, no locomotive brake cylinder pressure can be developed from an automatic brake application.

Should an automatic brake application be in effect when actuating air is applied, the air in pilot 48 of the relay valve 22 will flow back from port e through double check valve 32 and pilot valve 28 to the pilot 51 of pilot valve 27, causing port a of this valve to be connected to its port c which is open to exhaust. This allows the pressure in the auxiliary reservoir to be reduced by flowing out to exhaust through the pilot valve 27.

In the meantime, choke 40 allows controlled exhaust of pressure air from the relay pilot 48 and the valve pilot 51. When this pressure has decreased to about 5 psi, a spring in the pilot valve 27 resets valve 27, reconnecting ports a and b and stopping the reduction in auxiliary reservoir pressure. The timing of this action is controlled by the choke 40 so that the auxiliary reservoir pressure has dropped below brake pipe pressure by the time the pilot valve 27 is reset.

The resulting pressure differential within the control valve 20 drives the valve 20 to its release position. This connects control valve ports a and e, discharging the balancing reservoir 30 and allowing the auxiliary reservoir to be recharged to brake pipe pressure. The locomotive brakes are released through draining off the pilot air of valve 22 through choke 40. The locomotive brakes then remain released even if actuating pipe pressure is discharged unless a further brake pipe pressure reduction is made. In the meantime, the reduced pressure in the brake pipe and its resulting application of the train brakes is not affected.

The conventional ABDW type control valve 20 includes a feature known as service accelerated release. Upon moving to its release position, the valve operates to dump air from the emergency reservoir into the brake pipe so as to serially expedite release of all car valves in a train. This is prevented in the illustrated application to a locomotive by the check valve 35 which prevents back flow from the emergency reservoir to port d of valve 20 and thus avoids any possibility that actuating off of the locomotive brakes could produce a pressure wave in the brake pipe that would inadvertently release the train brakes.

In an emergency brake application, pressure in the brake pipe 46 is reduced to zero. When it drops below 10 psi the pilot valve 26 resets to connect ports a and b and thus connect the emergency reservoir in parallel with the auxiliary reservoir. Equalization of the pressure from these reservoirs and the balancing reservoir 30 provides the required emergency level of pilot pressure to the relay valve 22. The chokes 36 and 39 control the rate of pressure rise.

Emergency brake cylinder pressure can be actuated off as can a normal service application. However, since there is no brake pipe pressure in emergency, the control valve 20 does not move to the release position, so the brake cylinder pressure is reestablished upon the release of air from the actuating pipe 43.

Independent application of the locomotive brake without applying the train brakes is accomplished by the conventional method of applying pressure to the independent brake pipe through engineer's operation of the handle, not shown, of the independent brake portion of the valve 19. This action pressurizes the pilots 47 and 48 of the relay valve 22 providing adequate actuating pressure to apply the locomotive brakes at the desired level of application pressure. An independent brake application is conventionally released by draining pressure from the independent brake pipe 44 through the brake valve 19.

FIG. 2 EMBODIMENT

Figure 2:
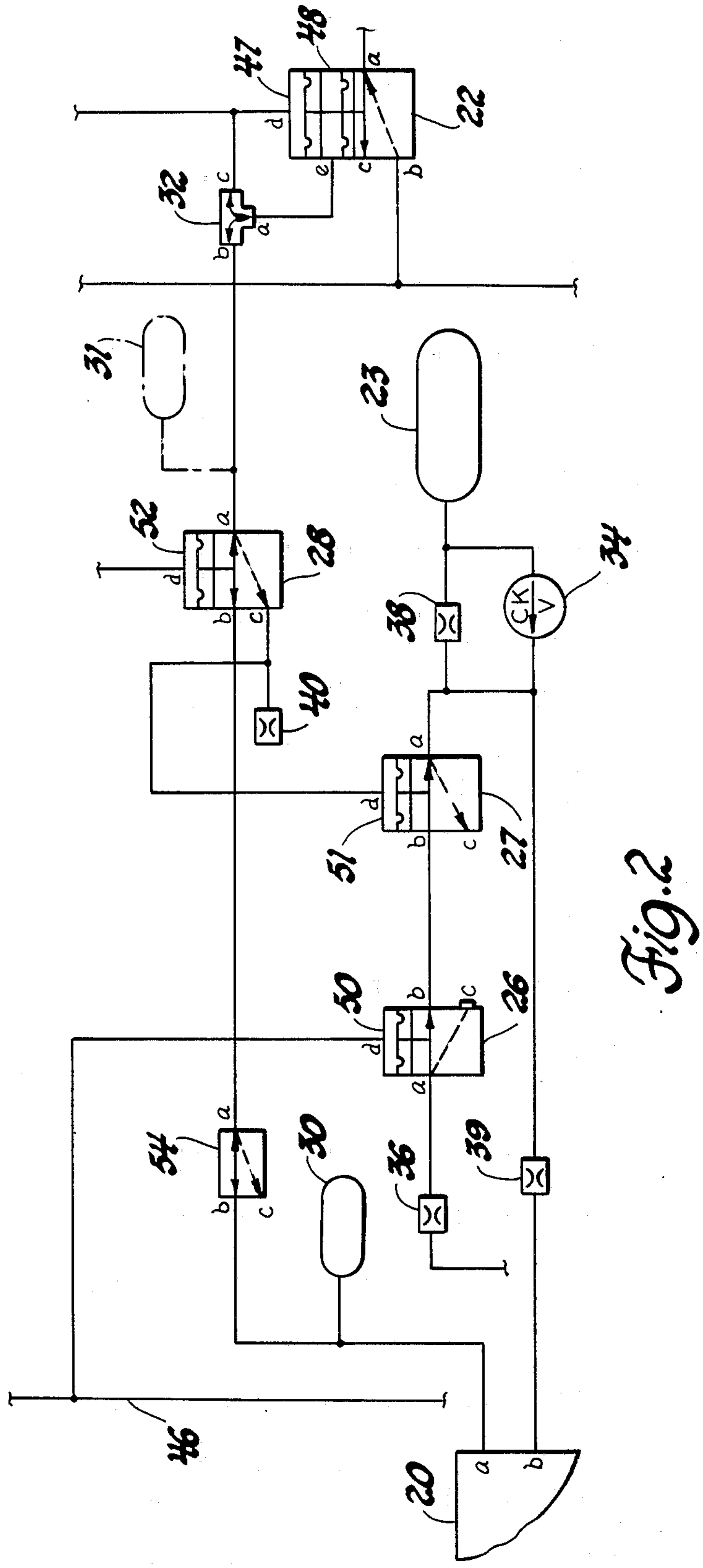
FIG. 2 is a schematic diagram showing a modification of a portion of the system of FIG. 1 to provide the functions required for type I dynamic brake interlock operation.

Referring now specifically to FIG. 2 of the drawings there is shown a modification of the brake system illustrated in FIG. 1 to provide for the application of a type I dynamic brake interlock. The diagrammatic view of FIG. 2 illustrates only the small portion of the embodiment of FIG. 1 in which the modification is shown, the non-illustrated portions being identical to the arrangement of FIG. 1. Like numerals are utilized to illustrate like components throughout the various figures.

The FIG. 2 embodiment differs from that of FIG. 1 solely by the addition of a dynamic brake interlock magnet valve 54 in the line between the control valve 20 and balancing reservoir 30 connected to port b of valve 54 on one side and the pilot valve 28 connected to port a of valve 54 on the other side.

When the dynamic brake is inoperative, the connection between the control valve 20 and pilot valve 28 remains unbroken and operation is as described previously with respect to the embodiment of FIG. 1.

When the locomotive dynamic brake is in operation, however, the magnet valve 54 is energized, connecting its port a with an exhaust port c. If an automatic brake application is then in effect, brake cylinder pressure is released by dumping pilot pressure from the relay valve 22 through oort c of the magnet valve 54. If an automatic brake application is made while the dynamic brake is in operation, brake cylinder pressure will not develop since the magnet valve cuts off communication of the control valve 20 with the relay valve 22 and, thus, prevents the passage of pilot air pressure to the relay valve 22. Should the dynamic brake be released when an automatic brake application is in effect, ports a and b of the magnet valve 54 will be reconnected and pressure will be allowed to pass from the control valve 20 to the relay valve pilot 48, thus establishing, or reestablishing, cylinder pressure in the locomotive brake cylinders and applying the brakes.

FIG. 3 EMBODIMENT

Figure 3:
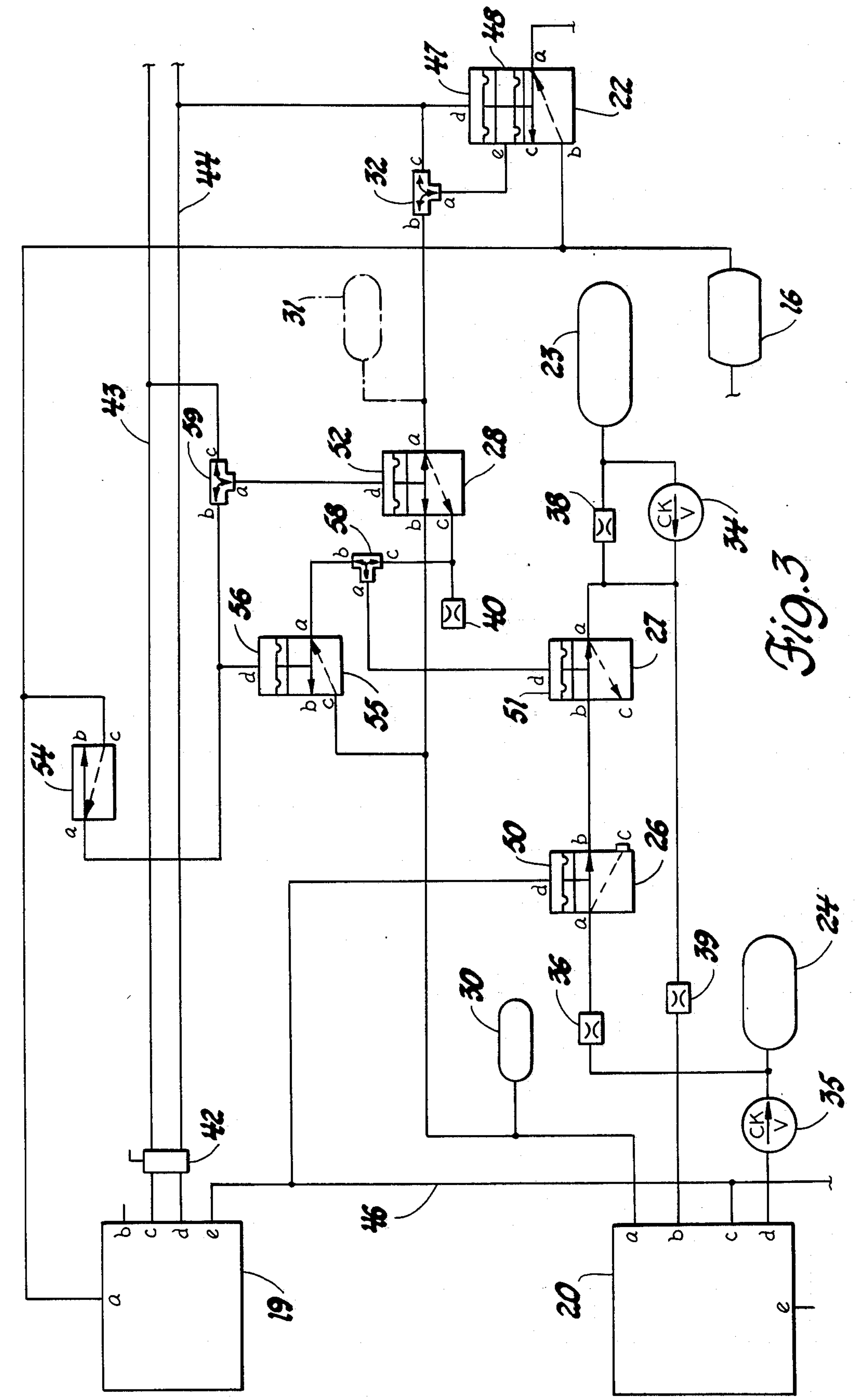
FIG. 3 is a schematic diagram showing a modified brake control system similar to that of FIG. 1 but including means to meet the requirements of the type II. dynamic brake interlocked systems.

Referring now to FIG. 3 of the drawings, there is shown a second alternative embodiment of the brake system of FIG. 1 wherein portions of the diagram not repeated are identical to those of the FIG. 1 embodiment.

The FIG. 3 embodiment provides for operation of a locomotive with a type II dynamic brake interlock. It differs from the embodiment of FIG. 1 by the addition of a magnet valve 54, a fourth pilot valve 55 having a pilot 56, and a pair of double check valves 58, 59, all having ports identified with letters such as a-d. The magnet valve 54 is connected between the main reservoir 16 and the pilots 56, 52 of the fourth pilot valve 55 and the third pilot valve 28 respectively. The double check valve 59 provides alternative connection of the pilot 52 with the actuating pipe 43 as in FIG. 1.

The fourth pilot valve 55 has a normally closed port c connected between the control valve 20 and the relay valve 22 in a location specifically between the third pilot valve 28 and the balancing reservoir 30. Normally open and connected ports a and b of the fourth pilot valve 55 are connected through the double check valve 58 with the pilot 51 of the second pilot valve 27. Double check valve 58 also provides an alternative connection from the pilot 51 to the normally closed port c of the third pilot valve 28 and to the choke 40 as in the arrangement of FIG. 1.

In operation, the magnet valve 54 is deenergized and closed whenever the locomotive is operating with the dynamic brake inactive. In this condition automatic and independent brake operation, including the function of actuating the brakes off, are conducted and function in exactly in the same manner as in the embodiment of FIG. 1. However, the system also provides for actuating the locomotive brakes off whenever the dynamic brake is in operation. Additionally the system provides for holding the locomotive brakes off whenever the dynamic brakes are released while the automatic brake is applied on the train even if a further reduction of brake pipe pressure has been made while the dynamic brake was in operation. This is accomplished by driving the control valve 20 to release after each automatic brake application.

In the system of FIG. 3, operation of the locomotive dynamic brake energizes the magnet valve 54, thereby connecting the main reservoir pressure with the pilots 56, 52 of pilot valves 55, 28 respectively. Pilot valve 28 operates in the same manner as when piloted by pressure in the actuating line to prevent a locomotive automatic brake application by cutting off flow from the control valve 20. It also releases a previously made automatic brake application by diverting the relay 22 pilot pressure to the pilot 51 of the second pilot valve 27, thereby reducing auxiliary reservoir pressure until the control valve 20 is driven to its release position and the reduction of the pilot pressure through choke 40 permits the second pilot valve 27 to reset.

At the same time, the fourth pilot valve 55 is moved to connect the control valve 20 through its ports a and c and the double check valve 58 with the pilot 51 of the second pilot valve. Thus, a subsequent reduction of brake pipe pressure which drives the control valve 20 to its brake application position, transmits pressure through the fourth pilot valve 55 and double check valve 58 to the pilot 51 of the second pilot valve 27, again resulting in dumping of auxiliary reservoir pressure until it is reduced below brake pipe pressure and the control valve is again driven to the release position. This allows the pressure in pilot 51 to bleed off through the control valve 20, returning pilot valve 27 to its normal operating position.

Under these operating conditions, disengaging operation of the dynamic brake will not cause an automatic brake application on the locomotive as long as the control valve remains in the release position which will be the case unless a further reduction of the brake pipe pressure is made thereafter or the system is reset by releasing the brakes and reapplying them.

COMPONENTS

It should be understood that the components making up the brake system embodiments of FIGS. 1 through 3 are, with the exception of the conventional locomotive brake valve 19, comprised of commonly used and/or inexpensively manufactured items having extensive application in railway brake systems. As previously indicated, the control valve 20 preferably comprises the service portion of a standard freight car ABDW control valve, or a comparable valve, preferably having the quick release portion deleted with the open ports crossported or blocked off. The pilot valves 26, 27, 28, 55 are commonly used H-type Relayair pneumatically piloted three-way valves, or their equivalent. The other items are either standard air system components or are easily manufactured variations of such components. Accordingly, a brake system of the sort described provides all the required operating functions of a freight or switcher locomotive brake with a substantial reduction in cost by the elimination of the specialized 26F or equivalent brake control valve made specifically for locomotive application.

ALTERNATIVE SYSTEMS

Alternative systems have also been developed for railway use which have improved operating characteristics over the sytems so far described in detail. These systems, shown in FIGS. 4–7, have many similarities with those of FIGS. 1-3; however, some differences in arrangement and equipment are involved by which certain operation improvements are provided. In particular, these alternative systems allow the locomotive brakes to be actuated off immediately after an automatic brake application to a train without incurring the need for subsequent actuation to prevent reapplication of the locomotive brakes as sometimes occurs with the preveiously described systems. For ease of comparison and understanding, like components in all the systemns have been given like reference numerals in the various figures where appropriate.

FIG. 4 EMBODIMENT

Figure 4:
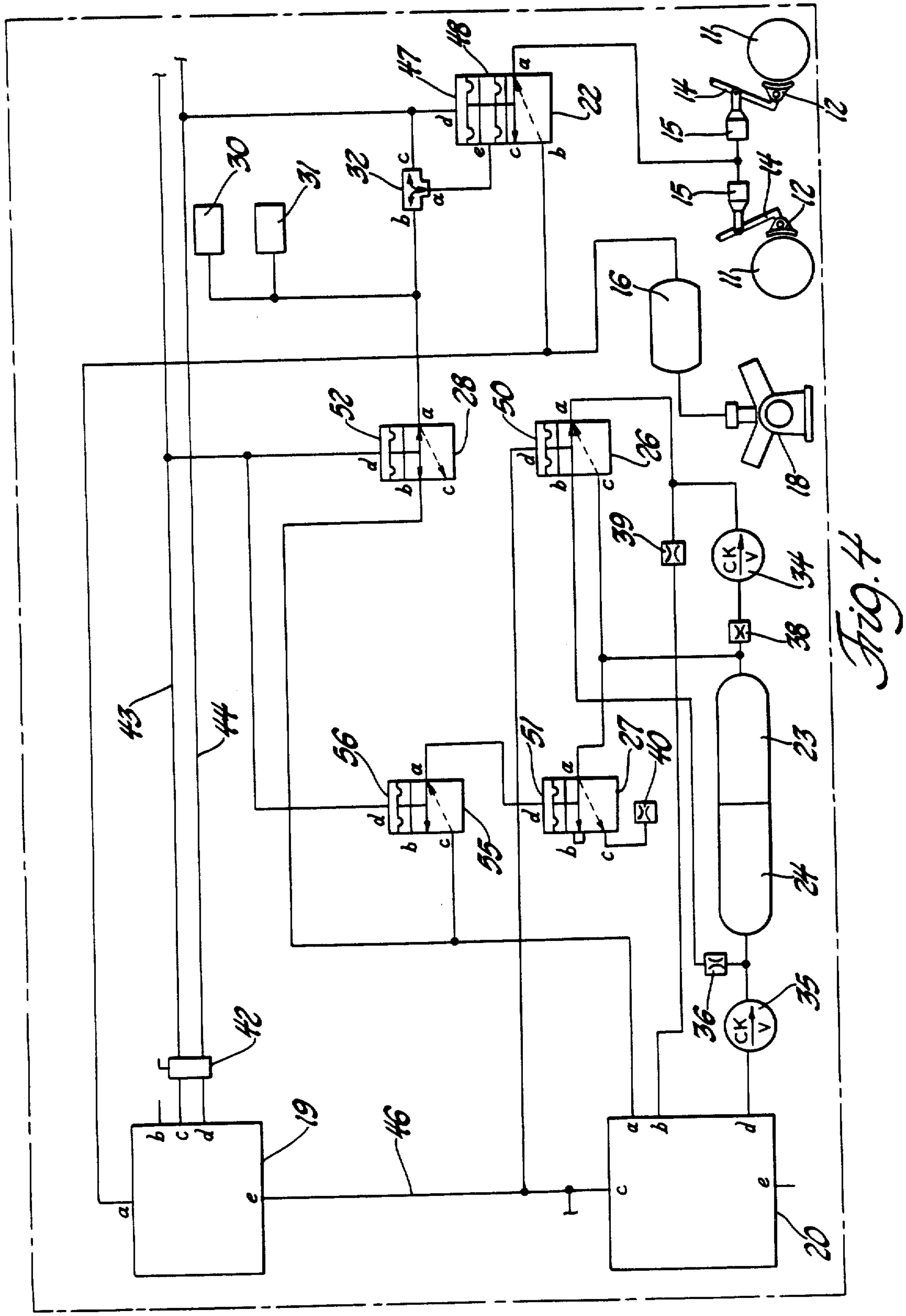
FIG. 4 is a schematic view of a locomotive with a modified air brake system for use with locomotives not equipped with dynamic brake.

Referring to FIG. 4, the locomotive air brake system shown provides results similar to the system of FIG. 1 but with the improved capability for immediate actuation previously mentioned. The components of the FIG. 1 embodiment are all utilized although some are modified. The system also adds a fourth pilot valve 55 with a pilot 56 as in FIG. 3.

The arrangement of FIG. 4 differs from FIG. 1 in the following ways:

(1) The balancing reservoir 30 is relocated to connect between port a of pilot valve 28 and the double check valve 32, in parallel with the optional reservoir 31.

(2) Choke 38 is resized and reconnected in series with check valve 34 for flow away from the auxiliary reservoir 23.

(3) Pilot valve 27 is removed from-the connection between control valve port b and the emergency reservoir 24. Instead, port a of pilot valve 27 is connected with the auxiliary reservoir 23 and with port c of pilot valve 26. Port b of valve 27 is blocked and port c exhausts through relocated choke 40 which is resized to ⅛ inch diameter.

(4) Port c of valve 28 is open to exhaust and the pilot 51 of valve 27 connects instead with port a of valve 55. Its pilot is connected to the actuating pipe 43, port b is open and port c connects with port a of control valve 20.

OPERATION

The operation of the FIG. 4 embodiment is very similar to that of FIG. 1 except for differences in the functions described subsequently. When the independent and automatic brake valve handeles, not shown, are in their release positions, the emergency reservoir is charged by the control valve 20 through port d. When the brake pipe pressure acting on pilot 50 is below 25 psi, pilot valve 26 also directs air from port b of control valve 20 and choke 39 through ports a and b and choke 36 to the emergency reservoir 24.

Brake pipe pressure above 25 psi moves the pilot valve 26 to connect ports a and c, causing the auxiliary reservoir to be charged with air from port b of the control valve 20, exhaust of the charging line being blocked by the closed port b of pilot valve 27. When the system is thus charged, the control valve 20 is in the release position. Port a is connected to exhaust at port e and there is no brake cylinder pressure applied on the locomotive. In addition, ports b and d of the control valve 20 are charged with brake pipe pressure and are connected to the auxiliary 23 and emergency 24 reservoirs, respectively.

An automatic brake application begins, as in FIG. 1, by operating the brake valve 19 to reduce pressure in the brake pipe 46, moving the control valve 20 to the application position wherein ports b and a are connected. This connects the auxiliary reservoir 23 with pilot 48 of the relay valve 22 through ports c and a of pilot valve 26, orifice 39, ports b and a of control valve 20, ports b and a of pilot valve 28, ports b and a of double check valve 32 and port e of the pilot 48. The pilot pressure operates the valve 22 to connect ports b and a and deliver air from the main reservoir 16 to the brake cylinders 15, applying the brakes.

Actuation to release or prevent application of the locomotive brakes during an automatic brake application to the train is accomplished, as in FIG. 1, by charging the actuating pipe 43 from port c of the brake valve 19. This pressure, applied to the pilot 52, connects ports a and c of valve 28, cutting off at port b the connection to the auxiliary reservoir 23 and exhausting through port c the pressure in pilot 48 and reservoirs 30 and 31. This operates valve 22 to connect ports b and a, exhausting pressure in the brake cylinders through port c of valve 22 and releasing the brakes.

The actuating pipe pressure is also applied to pilot 56, operating valve 55 to connect ports c and a. This directs pressure from port a of the control valve 20 to pilot 51 of valve 27, operating this valve to connect its ports a and c. This connection bleeds off air at a controlled rate through the choke 40 from the auxiliary reservoir 23 and the connecting lines through valves 26, 20 and 55 to the pilot 51. The exhausting of the auxiliary reservoir continues until its pressure drops below brake pipe pressure, driving the control valve 20 to its release position. This connects port a of valve 20 to exhaust the pressure on pilot 51, allowing valve 27 to reset and cut off further reduction of the auxiliary reservoir 23.

The choke 40 functions during actuation to:

(1) delay the reduction in auxiliary reservoir pressure sufficiently to allow completion of the full reduction in brake pipe pressure initiated by the locomotive operator and (2) limit the reduction in auxiliary reservoir pressure to slightly below brake pipe pressure.

The first function avoids premature release of the control valve 20 before the brake reaches its reduced level which sometimes occurs with the arrangement of FIG. 1. The second function allows a more rapid response in the event of reapplication of the brakes and reduces the amount of make up air needed to recharge the auxiliary reservoir.

Relocation of the balancing reservoir 30 to the downstream side (during a brake application) of valve 28 is effective to:

(1) Reduce the volume in the port a circuit of the control valve 20 to insure the complete exhausting of this circuit in the time interval that the independent brake valve handle is depressed. This avoids reapplication of the brakes by residual pressure in this circuit when the acuating pressure in pipe 43 is discharged by release of the independent brake valve handle (not shown).

(2) Increase the volume in the port a circuit of the pilot valve 28 to lengthen the time that the independent brake valve handle must be depressed to actuate of (release) the locomotive brakes. This provides adequate time for the required reduction of auxiliary reservoir pressure and the complete exhausting of the port a circuit of control valve 20.

The relocation of reservoir 30 and the sizing of choke 40 provide the proper timing to insure complete locomotive brake actuation under all operating conditions.

FIG. 5 EMBODIMENT

Figure 5:
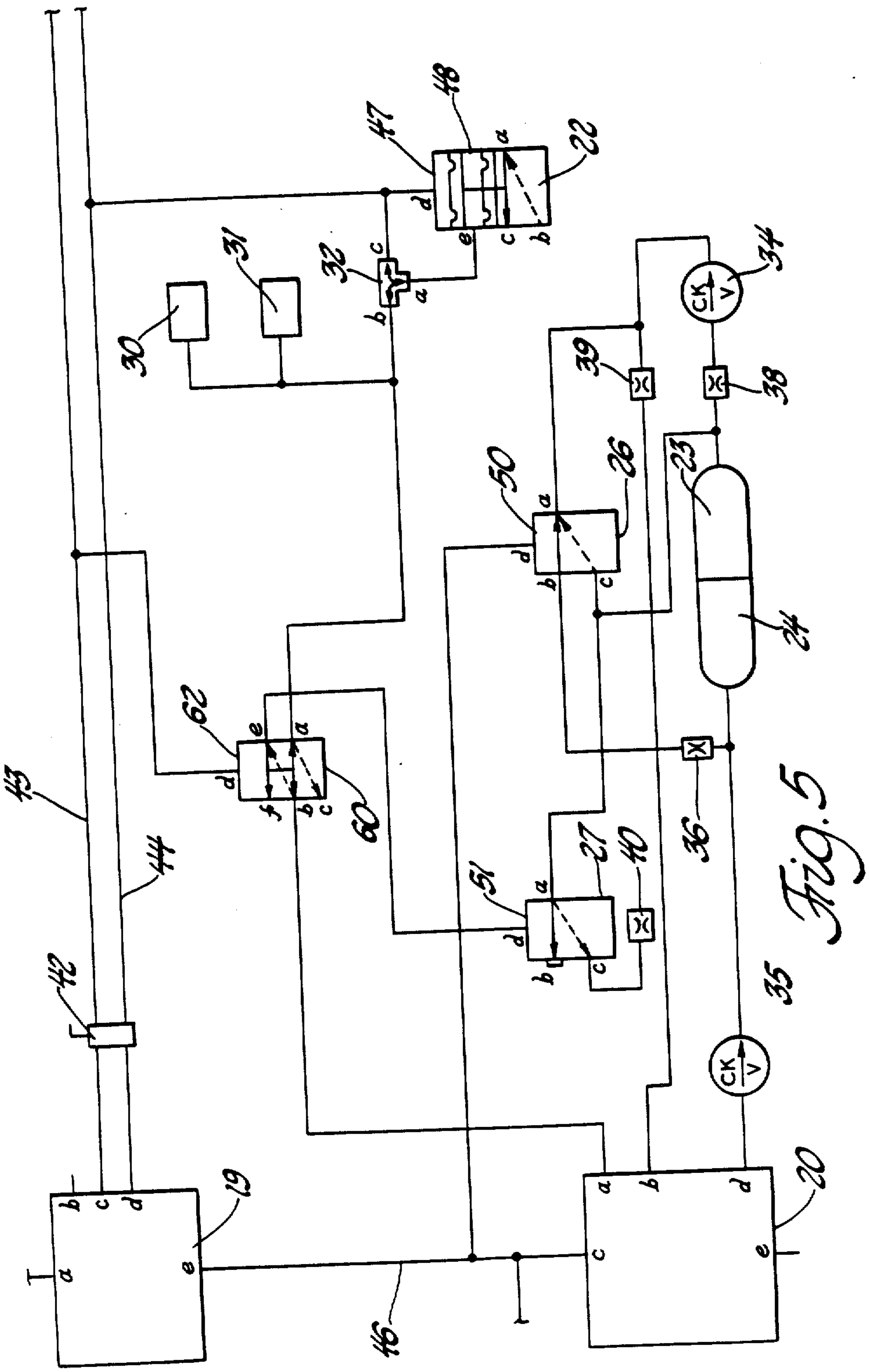
FIG. 5 is a schematic diagram showing a modification of a portion of the system of FIG. 4 in which certain components are combined to provide equivalent functions.

FIG. 5 illustrates a brake system which the functional equivalent of the embodiment of FIG. 4. It differs, however, in that the pilot valves 28 and 55 are replaced by a single spool pilot valve 60 having ports a, b, c, e, f and a pilot 62 with port d. The valve 60 is biased to normally internally connect ports a and b and ports e and f. When the pilot 62 is pressurized, the valve internally connects ports a and c and ports b and e.

The valve 60 in the system of FIG. 5 has its port a connected with the relay valve pilot 48 through the latter's port e and the double check valve 32, port b is connected to port a of the control valve 20, port c is open to exhaust and port d to the pilot 62 is connected to the actuating pipe 43. These connections are identical to those of pilot valve 28 in FIG. 4. Port e of valve 60 connects with the pilot 51 of valve 27 and port f is open to exhaust. Thus, the connections of ports e, f, b and d of valve 60 are identical to those of ports a, b, c and d, resPectively, of pilot valve 55 in FIG. 4.

In operation, the embodiment of FIG. 5 functions in the same manner as that of FIG. 4 with the spool valve 60 performing the functions of both valves 28 and 55 of FIG. 4 in the same manner as previously described.

FIG. 6 EMBODIMENT

Figure 6:
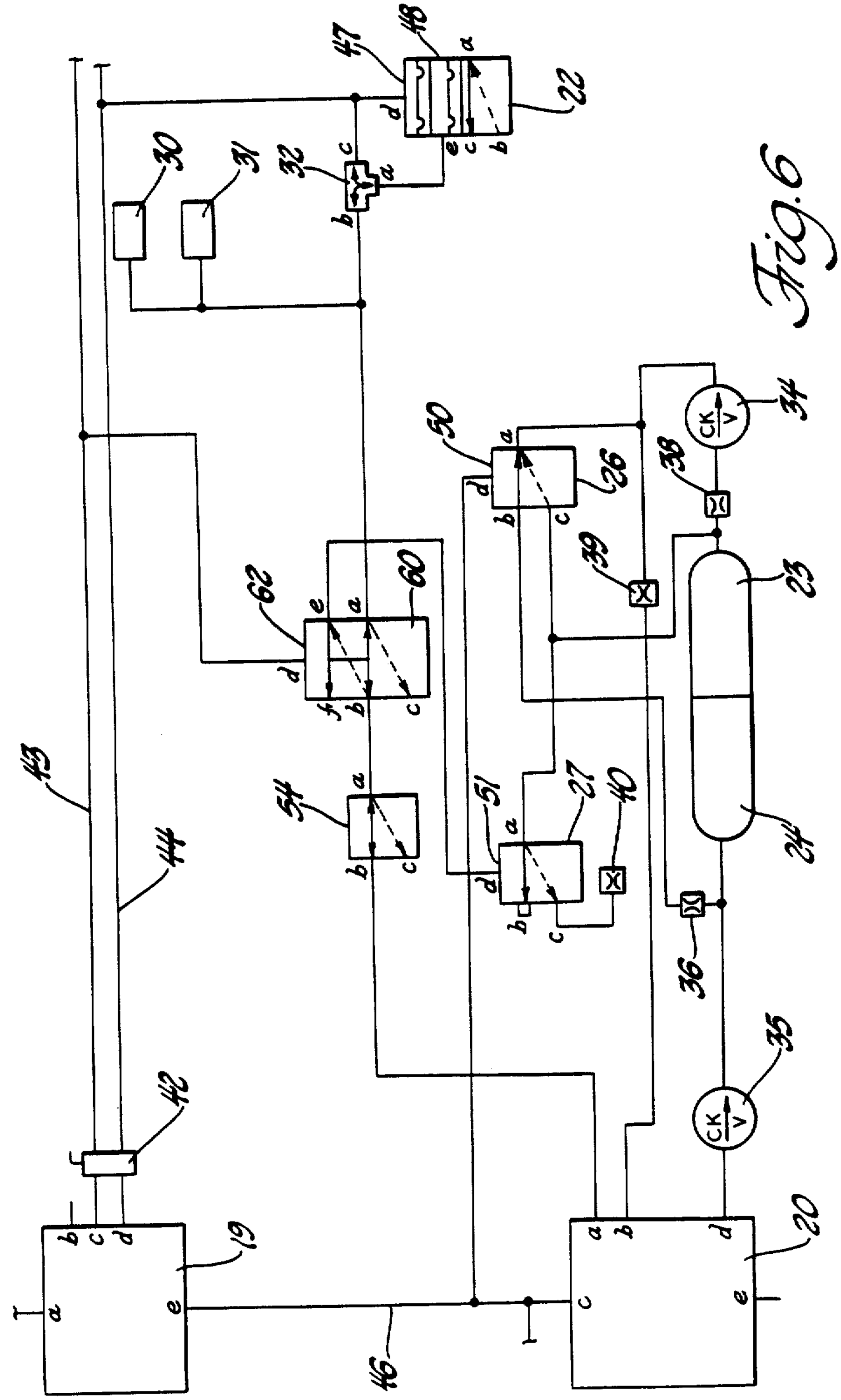
FIG. 6 is a schematic diagram showing a modication of the system of FIG. 5 to provide for type I dynamic brake interlock operation.

The embodiment of FIG. 6 provides for the application of a type I dynamic brake interlock as discussed with respect to FIG. 2. The system differs from that of FIG. 5 solely by the addition of a dynamic interlock magnet valve 54 in the line between port a of the control valve 20 and port b of the spool valve 60.

The magnet valve 54 operates as in FIG. 2 to release or prevent application of the locomotive brakes when the dynamic brake is operative but to allow reapplication of locomotive brakes if the dynamic brakes are released while an automatic brake application is in effect.

FIG. 7 EMBODIMENT

Figure 7:
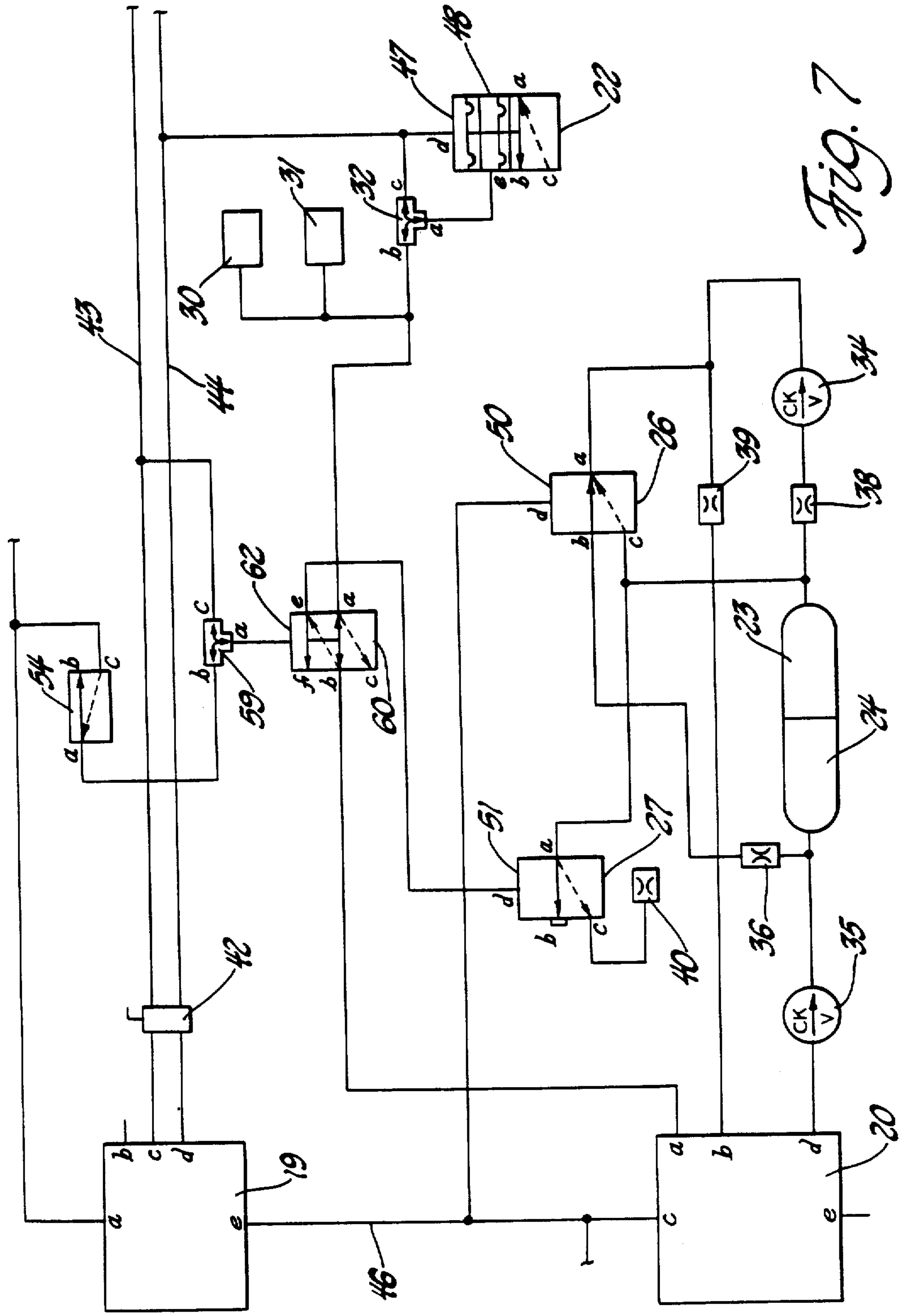
FIG. 7 is a schematic diagram showing a modification of the sytem of FIG. 5 to provide for type II dyanmic brake interlock operation.

The embodiment of FIG. 7 provides for operation of a locomotive with a type II dynamic brake interlock as discussed with respect to FIG. 3. The system differs from that of FIG. 5 by the addition of a magnet valve 54 and a double check valve 59. The double check valve provides alternative connection of the pilot 62 of valve 60 with the actuating pipe 43 and the main reservoir 16. The magnet valve 54 is connected between the main reservoir 16 and the check valve.

The magnet valve operates as in FIG. 3 to release or prevent application of the locomotive brakes when the dynamic brake is operative and to hold off the locomotive brakes after dynamic brake operation is discontinued until a further brake pipe reduction is made or the brakes are released and reapplied.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An air brake system for railway locomotives, said brake system comprising a brake valve having an automatic brake portion connected with a trainlined brake pipe and an independent brake portion connected with an independent brake pipe and a brake actuating pipe for controlling pressures in said pipes in response to operator action, a brake control valve connected with the brake pipe and with auxiliary and emergency reservoirs and a pilot of a relay valve, said control valve being responsive to reductions in pressure in the brake pipe below that of the auxiliary reservoir to transmit controlled pressure to the relay valve pilot from the auxiliary reservoir said relay valve pilot also being connected with the independent brake pipe to receive pilot pressure therefrom, said relay valve being connectable between a main reservoir and brake cylinders of a locomotive unit to control brake actuation and release in response to the presence or absence respectively of actuating pilot pressure first and second pilot valves between the emergency reservoir and the auxiliary reservoir and control valve said first pilot valve being responsive to a predetermined reduction in brake pipe pressure to connect the emergency reservoir to the control valve to transmit emergency reservoir pressure for brake application, said second pilot valve being normally open to air flow but responsive to pilot pressure to cut off flow from the emergency reservoir and bleed off auxiliary reservoir pressure, and a third pilot valve connected between the control valve and the relay valve pilot and normally open to flow therebetween but responsive to pilot pressure from the actuating pipe to cut off connection of the relay valve pilot with the control valve and connect the relay pilot pressure to the pilot of said second pilot valve and to a choke to directly release the brakes and to reduce auxiliary reservoir pressure to return the control valve to the brake released position, thus holding off the locomotive brakes during automatic brake application to a train.

2. A brake system according to claim and further comprising a dynamic brake valve connected between the control valve and the third pilot valve and normally operative to permit air flow therebetween but responsive to a signal indicating operation of a locomotive dynamic brake to cut off communication from the control valve and to discharge pilot pressure from the relay valve, thereby releasing the locomotive air brakes when the dynamic brake is operated but allowing reapplication of the locomotive air brakes when operation of the dynamic brake is discontinued.

3. A brake system according to claim 1 and further comprising a fourth pilot valve connected between the brake application port of the control valve and the pilot of the second pilot valve and having a pilot, the pilots of the third and fourth pilot valves being connected with the main reservoir, said fourth pilot valve normally venting the second pilot valve pilot but being responsive to main reservoir pressure to transmit control valve brake application pressure, if any, to the second valve pilot, and a dynamic brake valve connected between the third and fourth pilot valve pilots and the main reservoir and normally closed to flow therebetween, said dynamic brake valve being responsive to a signal indicating operation of a locomotive dynamic brake to transmit main reservoir pressure to the third and fourth valve pilots, whereby control valve pressure from an automatic train brake application occurring, maintained or increased during dynamic brake operation actuates the locomotive brakes off by venting auxiliary reservoir pressure through the second pilot valve sufficiently to return the control valve to its release position and locomotive brakes will therefore not reapply upon subsequent release of the dynamic brake without a later brake application or increase.

4. An air brake system for railway locomotives, said air brake sytem comprising a brake valve having an automatic brake portion connected with a trainlined brake pipe and a brake actuating pipe for controlling pressures in said pipes in response to operator action, a brake control valve connected with the brake pipe and with auxiliary and emergency reservoirs and a pilot of a relay valve, said control valve being responsive to reductions in pressure in the brake pipe below that of the auxiliary reservoir to transmit controlled pressure to the relay valve pilot from the auxiliary reservoir, said relay valve pilot also being connected with the independent brake pipe to receive pilot pressure therefrom, said relay valve being connectable between a main reservoir and brake cylinders of a locomotive unit to control brake actuation and release in response to the presence or absence respectively of actuating pilot pressure, a first pilot valve between the emergency reservoir and the auxiliary reservoir and control.valve and responsive to a predetermined reduction in brake pipe pressure to connected the emergency reservoir to the control valve to transmit emergency reservoir pressure for brake application, a second pilot valve connected with the auxiliary reservoir responsive to pilot pressure to bleed off auxiliary reservoir pressure, and additional pilot valve means connected with the control valve, the relay valve pilot and the actuating pipe and normally connecting the control valve and relay valve pilot to permit flow therebetween but responsive to pressure from the actuating pipe to cut off such connection, bleed off pressure from the relay valve pilot to release the brakes and connect pressure in said connection on one side of the additional pilot valve means to actuate the second pilot valve to reduce auxiliary reservoir pressure to return the control valve to the brake released position, thus holding off the locomotive brakes during an automatic brake application to a train.

5. An air brake system as in claim 4 wherein said additional pilot valve means comprises a third pilot valve connected directly to the pilot of the second pilot valve to connect, when actuated, residual pressure from the relay valve pilot side of the third pilot valve to the second valve pilot to acutate the second pilot valve.

6. An air brake system as in claim 4 wherein said additional pilot valve means comprises third and fourth pilot valves both connected with the control valve and the actuating pipe, said third pilot valve normally connecting the relay valve pilot with the control valve but responsive to pressure from the acutating pipe to cut off this connection and bleed off pressure from the relay valve pilot to release the brakes, said fourth pilot valve being responsive to pressure from the actuating pipe to connect control valve application pressure to the second valve pilot to actuate the second pilot valve.

7. An air brake sytem as in claim 4 wherein said additional pilot valve means comprise a dual pilot valve having a single pilot connected with the actuating pipe and actuating third and fourth valve portions both connected with the control valve, said third valve portion normally connecting the relay valve pilot with the control valve but cutting off such connection when actuated by actuating pipe pressure on the common pilot, and said fourth valve portion, when actuated, connecting brake application pressure from the control valve to the second valve pilot to actuate the second pilot valve.

* * * * *

UNITED STATES PATENT AND TRADEMARK OFFICE
CERTIFICATE OF CORRECTION

PATENT NO. : 4,660,895

DATED : April 28, 1987

INVENTOR(S) : Wayne E. Chlumecky et al

It is certified that error appears in the above-identified patent and that said Letters Patent is hereby corrected as shown below:

Insert Figures 4-7 as part of Letters Patent as shown on the attached sheets.

Column 2, line 67, "type" should read -- type II --.
Column 2, line 68, "systems:" should read -- systems; --.
Column 12, line 56, "claim" should read -- claim 1 --.
Column 13, line 53, "connected" should read -- connect --.
Column 13, line 31, after "and" insert -- an independent brake portion connected with an independent brake pipe and --.
Column 14, line 4, after "reservoir" insert -- and --.
Column 14, line 40, "comprise" should read -- comprises --.

Signed and Sealed this

Twenty-seventh Day of October, 1987

*Attest:*

DONALD J. QUIGG

*Attesting Officer*

*Commissioner of Patents and Trademarks*